United States Patent [19]
Dial et al.

[11] Patent Number: 5,772,074
[45] Date of Patent: Jun. 30, 1998

[54] DEVICE AND METHOD FOR INDICATING THE DISPENSING OF A PREDETERMINED AMOUNT OF A MATERIAL

[75] Inventors: Dwain Dial, Elk Grove Village, Ill.; Joseph Chang, Hsin Tien; Hwa Ming Huang, San Chung, both of Taiwan

[73] Assignee: Waterbury Companies, Inc., Waterbury, Conn.

[21] Appl. No.: 414,538

[22] Filed: Mar. 31, 1995

(Under 37 CFR 1.47)

[51] Int. Cl.⁶ .................................................. G01F 11/00
[52] U.S. Cl. ................................. 222/1; 222/37; 222/38; 222/646; 222/333
[58] Field of Search .................................. 222/1, 36, 37, 222/38, 39, 333, 639, 645, 646, 647, 648, 649

[56] References Cited

U.S. PATENT DOCUMENTS

| | | | |
|---|---|---|---|
| Re. 29,117 | 1/1977 | Sahajian et al. | 222/70 |
| 3,589,563 | 6/1971 | Carragan et al. | 222/70 |
| 3,952,916 | 4/1976 | Phillips | 222/70 |
| 3,993,444 | 11/1976 | Brown | 21/126 |
| 4,007,755 | 2/1977 | Lerner et al. | 137/101.21 |
| 4,063,664 | 12/1977 | Meetze, Jr. | 222/70 |
| 4,166,087 | 8/1979 | Cline et al. | 261/96 |
| 4,225,057 | 9/1980 | Horn | 222/36 X |
| 4,331,262 | 5/1982 | Snyder et al. | 222/37 |
| 4,383,951 | 5/1983 | Palson | 261/30 |
| 4,658,985 | 4/1987 | Madsen et al. | 222/649 X |
| 4,707,338 | 11/1987 | Spector | 422/124 |
| 4,719,851 | 1/1988 | Chesnut | 100/45 |
| 4,736,871 | 4/1988 | Luciani et al. | 222/25 |
| 4,817,822 | 4/1989 | Rand et al. | 222/38 |
| 4,830,791 | 5/1989 | Muderlak et al. | 261/26 |
| 5,038,972 | 8/1991 | Muderlak et al. | 222/25 |
| 5,040,106 | 8/1991 | Maag | 222/639 X |
| 5,111,477 | 5/1992 | Muderlak | 392/390 |
| 5,126,078 | 6/1992 | Steiner et al. | 261/26 |
| 5,175,791 | 12/1992 | Muderlak et al. | 392/390 |
| 5,249,718 | 10/1993 | Muderlak | 222/642 |
| 5,284,133 | 2/1994 | Burns et al. | 222/649 X |
| 5,301,873 | 4/1994 | Burke et al. | 222/646 X |
| 5,370,829 | 12/1994 | Kunze | 261/24 |

*Primary Examiner*—Joseph Kaufman
*Attorney, Agent, or Firm*—St. Onge Steward Johnston & Reens LLC

[57] ABSTRACT

A method is presented for indicating the dispensing of a predetermined amount of a material in a dispenser having a dispenser device which dispenses the material during periods of operation and frequency or intensity which can be varied. The inventive method includes determining the amount of time the dispenser device is operational; calculating a dispensing score representative of the time of operation of the dispenser device multiplied by a factor representative of the frequency or intensity of dispensing; and producing a signal indicating the dispensing of the predetermined amount of the material to be dispensed when the dispensing score is at least equal to a predetermined total score required for dispensing a predetermined amount of material. A dispenser incorporating such method is also described.

20 Claims, 3 Drawing Sheets

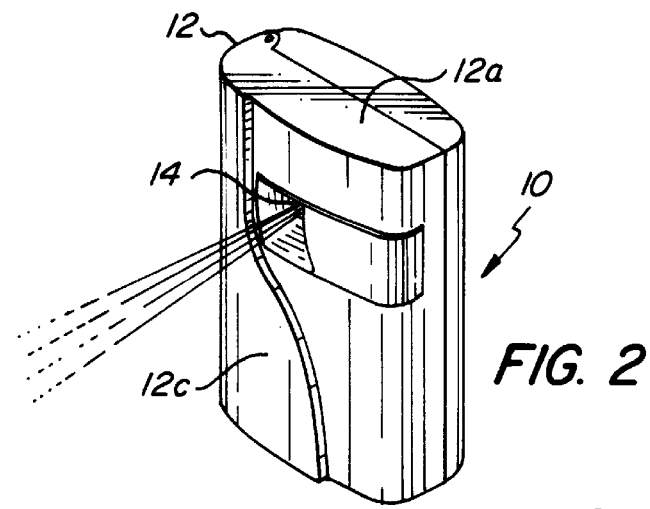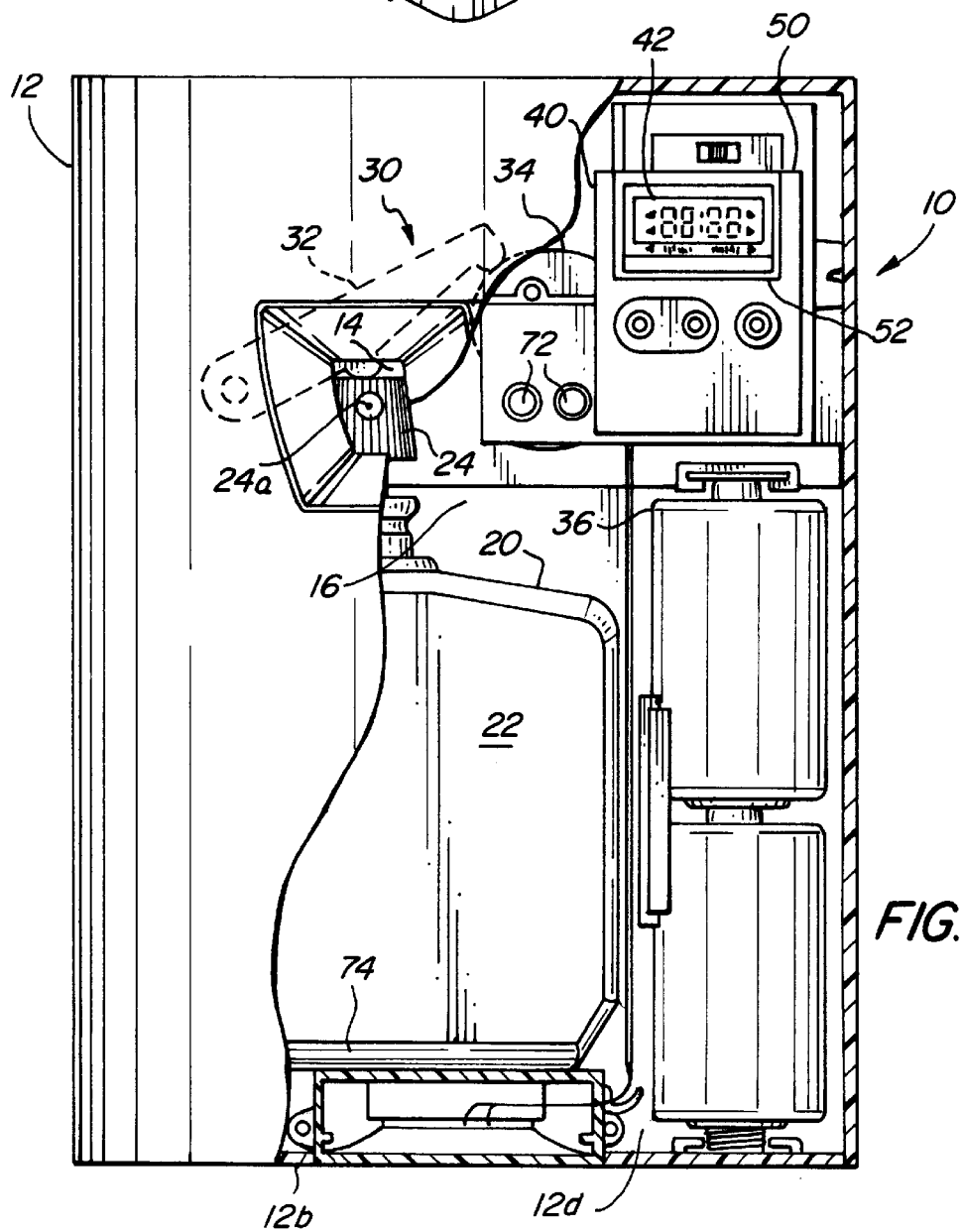

DEVICE AND METHOD FOR INDICATING THE DISPENSING OF A PREDETERMINED AMOUNT OF A MATERIAL

TECHNICAL FIELD

A method for indicating the dispensing of a predetermined amount of a material, especially a liquid, and a dispenser having a system for indicating the dispensing of a predetermined amount of a material are presented. More particularly, the present invention relates to a dispenser for an olfactory stimulating material, such as an air freshener composition, wherein the dispenser provides an indication of the need to replace the refill containing the olfactory stimulating material.

Dispensers which provide an olfactory stimulating material, such as an air freshener composition, are known, and often disposed, inter alia, in public rest rooms. Such dispensers provide to the surrounding atmosphere an olfactory stimulating material from a refill or other source of olfactory stimulating material. Since such sources of olfactory stimulating material are finite in size, they have to be replaced when empty, or when near empty, i.e., when a predetermined amount of the olfactory stimulating material has been dispensed.

However, many dispensers of olfactory stimulating material in use today do not operate solely on a continual basis, but rather only during set periods (such as during periods of daylight or during preset hours of operation) and do not operate to provide a constant level of olfactory stimulating material, but rather with variable frequency or intensity. In such situations, the dispensing of a predetermined amount of olfactory stimulating material, such as when the source of olfactory stimulating material is empty or near empty, can occur at different times depending on the operation of the dispenser. Accordingly, the conventional assumption that a predetermined amount of olfactory stimulating material has been dispensed after, for example, thirty days will no longer suffice.

What is needed, therefore, is a method for determining the dispensing of a predetermined amount of a material such as an olfactory stimulating material, which takes into consideration the variables in such dispensers. What is also needed is a dispenser having a system which uses such method for indicating the dispensing of a predetermined amount of a material such as an olfactory stimulating material.

BACKGROUND ART

It is only with the advent of variable frequency or intensity dispensers that the need for a means for indicating the dispensing of a predetermined amount of a material has become acute. Accordingly, little has been done to accommodate this need.

One example of a device which does provide an indication of when an aerosol container has been emptied is provided by U.S. Pat. No. 4,063,664 to Meetze, Jr., which utilizes a counter and/or a sensor to determine evacuation of an aerosol container. In a system like that of Meetze, Jr., Muderlak and Maloney, in U.S. Pat. No. 4,830,791, make use of a timer which provides pulses at periodic intervals, a counter which counts the pulses and generates a latch signal after a predetermined number of pulses is counted (corresponding to the calculated lifetime of the odor control cartridge) and a signal activated by the latch signal. As is apparent, this Muderlak and Maloney approach cannot compensate for variations in frequency and intensity, since the device discussed operates using a predetermined "count" of pulses which are generated at a predetermined frequency, to provide the desired signal.

In a refinement on their earlier work, Muderlak and Maloney describe a system very similar to that of Meetze, Jr. whereby the number of actuations of an aerosol dispenser is counted, and an indication of the dispenser being empty is provided after 3072 actuations, in U.S. Pat. No. 5,038,972. In U.S. Pat. No. 5,126,078, Steiner, Holzner, Hartman and Owen disclose a system which uses a timer to indicate either the need for replacement of the cartridge acting as the source of material to be dispensed or replacement of the battery (which are designed to coincide) of a fan type dispenser.

Unfortunately, nothing in the prior art provides a system having the flexibility to accommodate variations in either frequency or intensity of dispensing, whether the dispenser is a constant operation fan-driven dispenser, or a discrete event aerosol or pump dispenser. The present invention provides such a system.

SUMMARY OF THE INVENTION

Accordingly, it is an object of the present invention to provide a method for indicating the dispensing of a predetermined amount of a material, whereby variations in dispensing frequency and/or intensity are accommodated.

It is another object of the present invention to provide a method for indicating the dispensing of a predetermined amount of a liquid, especially an olfactory stimulating material, which can be employed in either a constant operation fan-driven dispenser, or a discrete event pump or aerosol dispenser.

It is yet another object of the present invention to provide a dispenser for a material, such as an olfactory stimulating material, which incorporates a system for indicating the dispensing of a predetermined amount of the material using the noted method.

It is a further object of the present invention to provide a dispenser for an olfactory stimulating material having a finite source of olfactory stimulating material, whereby the need to replace the source of olfactory stimulating material can be reliably indicated regardless of variations in dispensing frequency or intensity.

It is still another object of the present invention to provide an audible indication of the need to replace the source of olfactory stimulating material.

To overcome the deficiencies of the prior art and to achieve the objects and advantages listed above, Applicants disclose, in a preferred embodiment, a dispenser for a material, especially a liquid, which includes a source of a material to be dispensed; a housing having an internal cavity sized to permit insertion therein of the source of material to be dispensed; dispensing means for dispensing into the environment the material from the source of material to be dispensed when the dispensing means is operational; and a system for indicating the dispensing of a predetermined amount of the material to be dispensed, including a timer for determining the amount of time the dispensing means is operational, a calculator for calculating a number or dispensing score representative of the amount of time the dispensing means is operational multiplied by a factor representative of the frequency and/or intensity of operation, and a signal generating means for producing a signal indicating the dispensing of the predetermined amount of the material to be dispensed when the calculated dispensing score is at least as much as a predetermined total score required for dispensing a predetermined amount of material from the source of material to be dispensed.

In another preferred embodiment, Applicants disclose a method for indicating the dispensing of a predetermined amount of the material in a dispenser having a housing having an internal cavity sized to permit insertion therein of a source of material to be dispensed and dispensing means for dispensing into the environment the material from the source of material to be dispensed when the dispensing means is operational. The method includes the steps of: determining the amount of time the dispensing means is operational; multiplying the operational time by a factor representative of the frequency or intensity of dispensing to arrive at a dispensing score; and producing a signal indicating the dispensing of the predetermined amount of the material to be dispensed when the determined dispensing score is at least as much as a predetermined total score required for dispensing a predetermined amount of material to be dispensed.

The present invention is applicable to a variety of dispensers capable of dispensing a material, especially an olfactory stimulating material. For instance, one such dispenser is a fan driven dispenser, wherein the olfactory stimulating material is in liquid form, or incorporated in a gel. One example of such a dispenser is that disclosed by Kunze in U.S. Pat. No. 5,370,829. The fan creates air flow across the surface of the liquid or gel, causing vaporization and dispersal of the olfactory stimulating material. More particularly, such a dispenser has a housing containing at least one inlet vent and one outlet vent, a fan powered by, e.g., a battery, for directing air into and out of the vents, and a source of an olfactory stimulating material in the form of a cartridge containing a vaporizable substance (i.e., a gel incorporating the olfactory stimulating material), which is vaporized by the air flow generated by the fan and directed into the environment through the outlet vents. Due to the arrangement of the fan, vents and cartridge, the air flow is across the surface of the vaporizable substance which causes dispensing of the olfactory stimulating material.

When the fan is operated continually or at a constant speed, the amount of time necessary to dispense a predetermined amount of the olfactory stimulating material, such as that necessary to empty the cartridge, can be readily estimated. However, if the fan is capable of operating at selected times or at variable speeds (i.e., variable intensities), such estimations are not helpful, since the actual time to empty the cartridge will depend on how long the fan is operating and at each given speed. In order to compensate when the fan is capable of operating at different times and/or at variable speeds, the dispenser and method of the present invention applies a multiplier to the time of operation to produce a dispensing score which is, in effect, an adjusted or weighted time, which is then compared with the estimated time necessary to dispense a predetermined amount of the liquid to be dispensed.

For instance, if the fan is running at x rate for 50 hours and at 2x rate for 25 hours, the dispensing score is 100 hours (50 plus (2 times 25)). If the estimated time for dispensing a predetermined amount of the liquid to be dispensed when the fan is running at x rate is 100 hours, the dispenser provides an indication that the predetermined amount of the liquid to be dispensed has been dispensed after 75 hours of actual operation.

Another dispenser applicable for use in the present invention is a dispenser which actuates a pump or aerosol dispenser, i.e., dispensers wherein the liquid to be dispensed is contained in a container which is actuated in discrete events by depressing a spray head. Although pump dispensers can technically be defined as aerosols, the two terms are being employed separately to denote non-propellant driven dispensers and propellant driven dispensers, respectively. One such dispenser for pumps or aerosols is disclosed by Carragan and Vecca in U.S. Pat. No. 3,589,563 (although it will be noted that the Carragan and Vecca patent is written in terms of aerosol dispensers, the same principles will apply to non-propellant driven pump dispensers). Briefly, as taught by Carragan and Vecca, an actuating arm rides on a cam. When the radius of the cam decreases, the arm is forced downward, where it contacts and depresses the spray head of the aerosol (or pump) container, causing dispersal of the olfactory stimulating material.

Again, when the frequency of actuation of the aerosol or pump dispenser is constant, the amount of time necessary to dispense a predetermined amount of the olfactory stimulating material, such as that necessary to empty the aerosol or pump container, can be readily estimated. If, however, the dispenser is capable of operating at different times or at different frequencies, such as four per hour, six per hour and twelve per hour, such estimations are not helpful, since the actual time for emptying the container will depend on how long the dispenser is operating at each given frequency. In order to compensate when the actuator is capable of operating at variable frequencies, the dispenser and method of the present invention applies a multiplier to the time of operation to produce a dispensing score which is, in effect, an adjusted or weighted time, which is then compared with the estimated time necessary to dispense a predetermined amount of the liquid to be dispensed.

For instance, if the actuator is running at x frequency for 50 hours and at 1.5x frequency for 50 hours, the dispensing score is 125 hours (50 plus (1.5 times 50)). If the estimated time for dispensing a predetermined amount of the liquid to be dispensed, when the dispenser is operating at x frequency, is 125 hours, the dispenser provides an indication that the predetermined amount of liquid to be dispensed has been dispensed after 100 hours of actual operation.

A third dispenser which can be used wit h the present invent ion is one in which the material to be dispensed is present in a solid block of material. When heat is applied to the block, the material to be dispensed is vaporized and dispersed to the environment. Of course, variation in the heat applied will cause variation in the intensity of dispersal, which can be compensated for, in determining when to replace th e block, by the present invention.

Whether the dispenser is a fan dispenser, or an aerosol or pump dispenser (i.e., a spray head dispenser), or other type of dispenser, the dispenser comprises a housing which ha s an internal cavity sized to permit insertion of a source of a material to be dispensed (i.e., the cartridge in a fan dispenser and an aerosol or pump container in a spray head dispenser) and a dispensing means (i.e., the fan in a fan dispenser or the actuator/cam assembly in a spray head dispenser). In addition, th e dispenser of the present invention includes a system for indicating the dispensing of a predetermined amount of the material to be dispensed, such as an olfactory stimulating material.

Advantageously, the dispenser of the present invention also includes control means for the dispensing means, to control the frequency and/or intensity of dispensing. For instance, the control means can comprise a clock which is operatively connected to the dispensing means, such that the clock can be set for desired hours of operation (for instance, 8:00 a.m. to 6:00 p.m.), wherein the dispenser is active and dispensing during those hours of operation. In the alternative, the control means can comprise a light sensor, such as a cadmium-sulfide photocell, which is operatively connected to the dispensing means such that the dispensing means is active and operating during periods when the ambient light is above or below certain levels.

The control means can also provide control over the frequency or intensity of dispensing. For instance, the control means can include a timer circuit, such as a timer driven off the clock used to set the hours of operation or one controlled by the use of one or more capacitors. The timer circuit is operatively connected to the dispensing means such that the frequency of dispensing can be controlled. The timer can have a variety of settings which control frequency of dispensing. For instance, a first setting for the timer circuit may trigger the actuating arm in a spray head dispenser to dispense liquid every fifteen minutes, whereas a second setting may trigger the arm to dispense liquid every ten minutes and a third setting may trigger the actuator to dispense liquid every five minutes. Likewise, the control means can control the intensity (i.e., speed of operation) of the fan in a fan dispenser.

In order to provide an indication that a predetermined amount of material has been dispensed, the dispenser of the present invention also comprises a system which includes a system timer for determining the amount of time the dispensing means is operational (which can also be driven off the clock used to set the hours of operation of the dispenser); a calculator which calculates a dispensing score representative of the amount of time the dispensing means is operational multiplied by a factor representative of the frequency and/or intensity of operation; and a signal generating means which produces a signal representative of the fact that the predetermined amount of the material to be dispensed has been dispensed when the calculated dispensing score is at least equal to a predetermined total score required for dispensing a predetermined amount of liquid to be dispensed.

The signal generating means includes a comparator for comparing the calculated dispensing score with the total score. In addition, the signal can take the form of a diode (i.e., a light emitting diode, or LED) or other light source, or an audible signal such as a "beep" or a recorded voice advising the user of the dispensing of the predetermined amount of the material to be dispensed (such as a recorded voice that advises the user that it is time to replace the source of olfactory stimulating material). This audible signal can be periodically repeated.

When the control means employed in conjunction with the dispensing means of the dispenser of the present invention permits variations in frequency and/or intensity, the calculator comprises a multiplier, which in turn is operatively connected to the control means. In this way, when the control means provides for a certain frequency or intensity of operation of the dispensing means, the multiplier will apply the appropriate multiplication factor to the time of operation provided by the system timer to arrive at the dispensing score, i.e., an adjusted time of operation. This adjusted time of operation is then provided to the signal generating means (more specifically, the comparator thereof) to determine when the signal is to be generated.

Of course, it will be recognized that the clock, control means timer, system timer, calculator, and signal generating means, or any parts thereof, can be effected by a set of software code housed in a chip or processor unit, which thereby controls operation and signalling of the dispenser of the present invention.

These and other objects will become more readily apparent when the following description is read in conjunction with the accompanying drawings.

BRIEF DESCRIPTION OF THE DRAWINGS

FIG. 1 is a partially broken away front plan view of a spray head dispenser constructed in accordance with the present invention, showing a portion of its dispensing means in phantom;

FIG. 2 is a perspective view of the spray head dispenser of FIG. 1, shown dispensing an olfactory stimulating material;

DETAILED DESCRIPTION OF THE DRAWINGS

Figure 3:
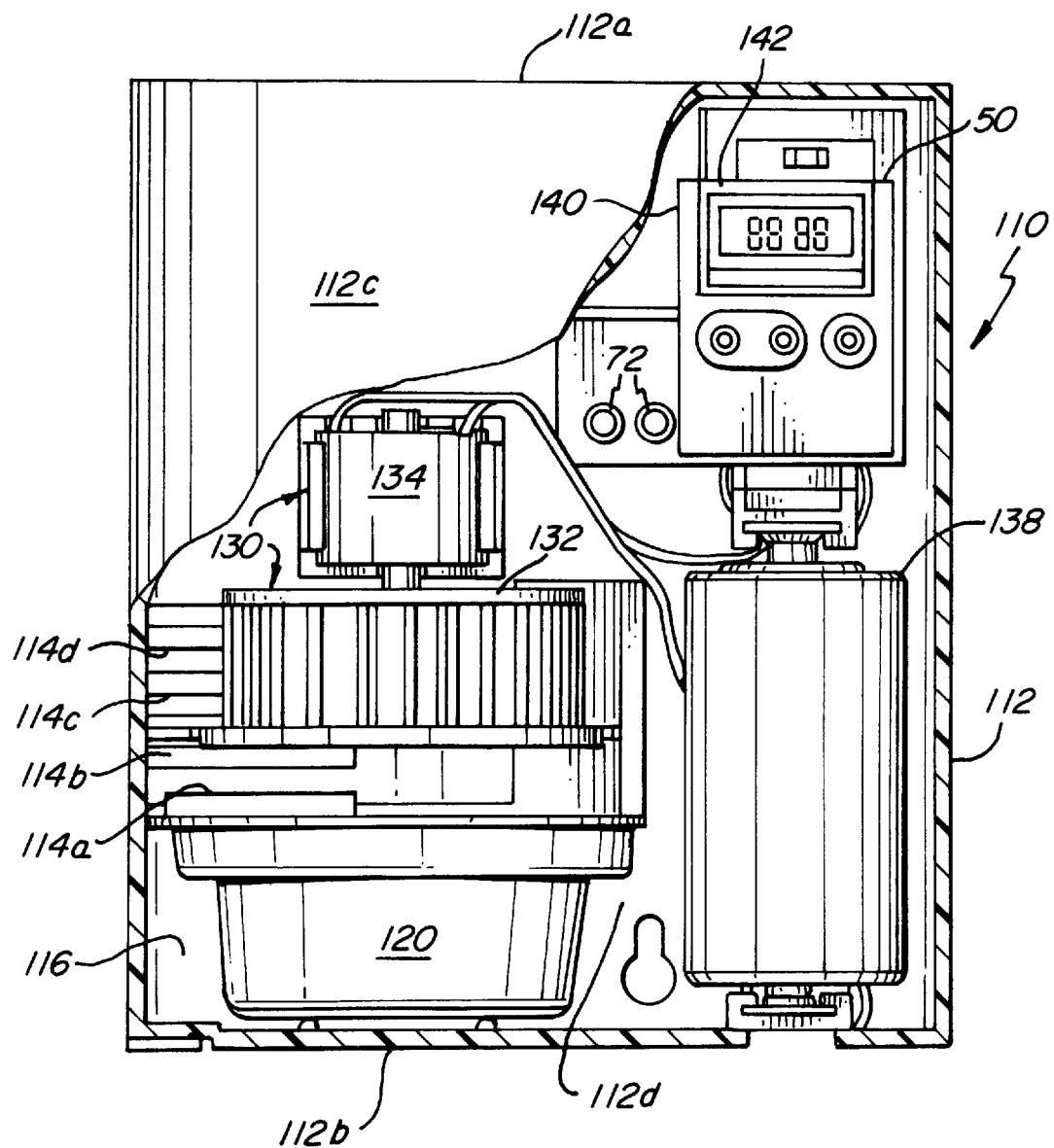
FIG. 3 is a partially broken away front plan view of a fan dispenser constructed in accordance with the present invention, showing a portion of its dispensing means in phantom.

Referring to FIGS. 1 and 3, dispensers, constructed in accordance with the present invention, are shown and generally designated by the reference numerals 10 and 110. It should be noted that, for the sake of clarity, all the components and parts of dispensers 10 and 110 may not be shown and/or marked in all the drawings. Also, as used in this description, the terms "up", "down", "front", "back", "top", "bottom", etc. refer to dispensers 10 and 110 when in the orientation illustrated in FIGS. 1 and 3. It will be understood, however, that dispensers 10 and 110 may be in any of various orientations when in use, and, as such, the orientation illustrated in FIGS. 1 and 3 is not necessary for operability.

Although this description is written in terms of dispensing an olfactory stimulating material, such description is for convenience only. It should be understood that the present invention applies to a dispenser for any dispensable material, especially a liquid (whether it be dispensed in liquid form per se, or carried in a gel or like solidifying material), such as an antistatic agent. By "olfactory stimulating material" is meant any material which affects the olfactory response to the environment of a room or like space. Included within the term "olfactory stimulating material" are fragrances, perfumes, deodorizing components, etc. Such materials are generally liquid in active form, i.e., when vaporized in the environment to provide olfactory stimulating effects; however, when present in dispenser 10 or 110, the olfactory stimulating material may be present incorporated in a carrier medium such as a gel.

Spray Head Dispenser

Referring now to FIG. 1, dispenser 10 generally comprises a housing 12. Housing 12 comprises a vent 14 through which olfactory stimulating material to be dispensed from a spray head dispenser can be expelled into the environment surrounding housing 12 (see FIG. 2). Housing 12 can be made of any suitable material, such as a plastic, like low- or high-density polyethylene, polypropylene or medium impact styrene, and can be made by any suitable method, such as by injection molding.

Housing 12 includes an internal cavity 16 defined by top 12a, bottom 12b, front 12c and back 12d of housing 12. Housing 12 can stand freely on a surface or it can be mounted on a surface, such as a wall, or other vertical surface through back 12d. Desirably, front 12c is hingeably secured to housing 12, to permit opening of housing 12, and insertion of a source of olfactory stimulating material into cavity 16.

Cavity 16 of housing 12 is sized to permit insertion of an appropriate source of olfactory stimulating material therein.

For instance, a spray head container 20 can be inserted into cavity 16. Spray head container 20 comprises any source of olfactory stimulating material which includes a reservoir 22 which contains the olfactory stimulating material to be dispensed, and means for dispensing the olfactory stimulating material by depressing a spray head 24. Typical among spray head containers 20 is one which includes a propellant material with the olfactory stimulating material in reservoir 22, under pressure, such that depressing spray head 24 forces both the olfactory stimulating material and propellant through a spray head orifice 24a and out vent 14. Such containers are generally referred to as aerosol containers. Another typical spray head container 20 is one in which depressing spray head 24 causes olfactory stimulating material to be mechanically expelled, or pumped, through spray head orifice 24a and out vent 14. Both types of spray head containers 20 are known in the art.

Dispenser 10 also comprises a dispensing means 30, which functions to actuate spray head container 20 such that olfactory stimulating material is automatically dispensed from dispenser 10. A typical dispensing means 30 is disclosed by Carragan and Vecca in U.S. Pat. No. 3,589,563, the disclosure of which is hereby incorporated by reference herein. Such an apparatus includes an actuating arm 32 which is biased downward by, e.g., a spring (not shown). An end of actuating arm 32 rides along the surface of a cam 34, which has a variable radius. Upon reaching a reduced radius portion of cam 34, actuating arm 32 is forced downward where it strikes and depresses spray head 24, causing dispensing of olfactory stimulating material through spray head orifice 24a and vent 14. Cam 34 is driven through the agency of suitable gearing and a motor (not shown), which is powered by a source of energy, such as a battery 36.

In addition to dispensing means 30, dispenser 10 also comprises control means 40, which controls when dispensing means 30 causes dispensing of the olfactory stimulating material. Control means 40 is in operative connection with dispensing means 30, such as through a suitable circuit (not shown), and can control various aspects of dispensing means 30, including the hours of operation of dispensing means 30, in which case control means 40 comprises a clock or timer 42 and/or a light sensor (not shown); and the frequency of actuation of spray head 24 by actuating arm 32, in which case control means 40 makes use of clock or timer 42, which sends pulses triggering dispensing means 30 to dispense olfactory stimulating material at certain intervals. Suitable control means 40 for controlling dispensing means 30 are known in the art (see, e.g., Carragan and Vecca).

Fan Dispenser

Like dispenser 10, dispenser 110 generally comprises a housing 112. Housing 112 comprises at least one, and most commonly a plurality of vents 114a, 114b, 114c, 114d, etc., which comprise inlet vents 114a, 114b and outlet vents 114c, 114d. Housing 112 can be made of any suitable material, such as a plastic, like low- or high-density polyethylene, polypropylene or medium impact styrene, and can be made by any suitable method, such as by injection molding.

Housing 112 includes an internal cavity 116 defined by top 112a, bottom 112b, front 112c and back 112d of housing 112. Housing 112 can stand freely on a surface or it can be mounted on a surface, such as a wall, or other vertical surface through back 112d. Desirably, front 112c is hingeably secured to housing 112, to permit opening of housing 112, and insertion of a source of olfactory stimulating material into cavity 116.

Cavity 116 of housing 112 is sized to permit insertion of an appropriate source of olfactory stimulating material therein. For instance, a cartridge 120 can be inserted into cavity 116. Cartridge 120 comprises a housing 122 which has a reservoir which contains the olfactory stimulating material to be dispensed by dispenser 110, either in its liquid form, or incorporated in a suitable carrier agent, such as a gel. Whether the olfactory stimulating material is present as a liquid or incorporated in a gel, dispensing occurs when air flows across the surface of the olfactory stimulating material, vaporizing the material, and carrying out into the environment which the air.

Dispenser 110 also comprises a dispensing means 130, which creates an air flow across the surface of the olfactory stimulating material in cartridge 120. A typical dispensing means 130 is disclosed by Kunze in U.S. Pat. No. 5,370,829, the disclosure of which is hereby incorporated by reference herein. Such an apparatus includes a fan 132, which creates a flow of air in inlet vents 114a, 114b across the surface of olfactory stimulating material in cartridge 120 and out outlet vents 114c, 114d. Fan 132 is driven through the agency of suitable gearing and a motor 134, which is powered by a source of energy, such as a battery 138.

Like dispenser 10, dispenser 110 also comprises control means 140, which controls when dispensing means 130 causes dispensing of the olfactory stimulating material. Control means 140 is in operative connection with dispensing means 130, such as through a suitable circuit (not shown), and can control various aspects of dispensing means 130, including the hours of operation of dispensing means 130, in which case control means 140 comprises a clock or timer 142 and/or a light sensor (not shown); and the intensity of operation of fan 132. Suitable control means 140 for controlling dispensing means 130 are known in the art.

System for Indicating Dispensing of a Predetermined Amount of the Material

For either dispenser 10 or dispenser 110, a system 50 is provided in order to produce an indication that a predetermined amount of the olfactory stimulating material has been dispensed. System 50 generally includes a system timer for determining the amount of time that dispensing means 30 or 130 is operational; a calculator which calculates a dispensing score representative of the amount of time dispensing means 30 or 130 is operational multiplied by a factor representative of the frequency and/or intensity of operation; and a signal generating means which produces a signal representative of the fact that the predetermined amount of the olfactory stimulating material to be dispensed has been dispensed when the calculated dispensing score is at least equal to the total score required for dispensing a predetermined amount of the olfactory stimulating material.

Although system 50 can function mechanically, it is most preferably run pursuant to a software code incorporated into a chip or processor 52 which may provide instructions for control means 40 and 140, as well as clock or timer 42 and 142. FIG. 3 is a functional block diagram depicting a system 50 for providing an indication that a predetermined amount of the olfactory stimulating material has been dispensed. By "predetermined" amount of the olfactory stimulating material is meant any amount after which it is desired that there be an indication of that amount having been dispensed. Most commonly, the predetermined amount will be the amount of olfactory stimulating material present in spray head container 20 or cartridge 120, thus providing an indication that spray head container 20 or cartridge 120 is empty or near empty and needs to be replaced.

Figure 4:
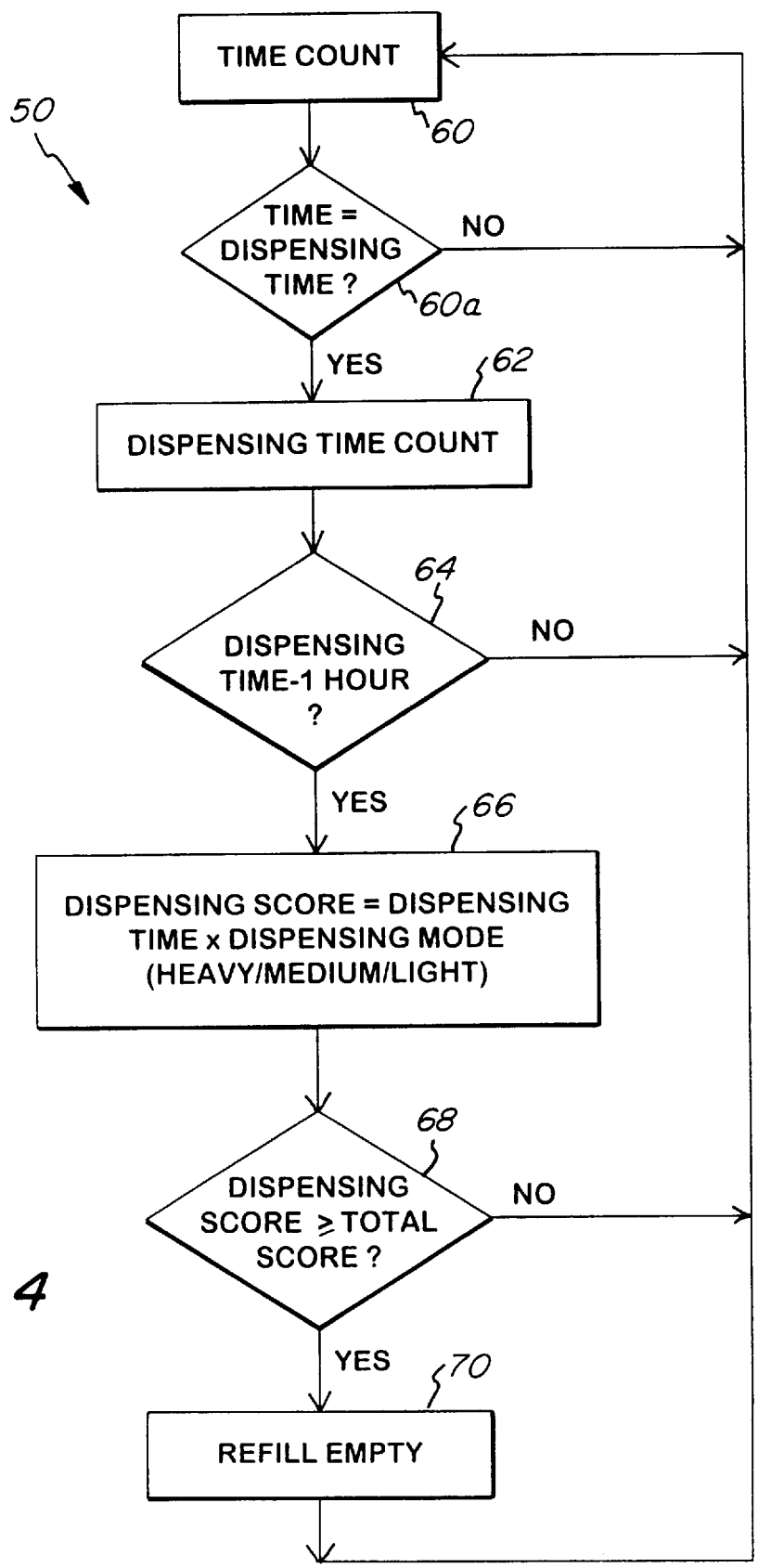
FIG. 4 is a functional block diagram detailing the determining and indicating of the dispensing of a predetermined amount of a material from the dispensers of FIGS. 1 and 3.

Referring to FIG. 4, a time count is maintained 60, such as by clock or timer 42 or 142; when dispensing means 30 or 130 is operational 60a, the time count is equal to the dispensing time 62 to thus provide a dispensing time count 64. When the dispensing time count 64 reaches one hour it is recorded; otherwise, for periods less than one hour the time is not recorded. The recorded dispensing time count 64, in hour increments, is multiplied by a multiplier representative of the frequency or intensity of dispensing 66, represented as "dispensing mode", to produce a dispensing score. For instance, if a standard is adopted as a dispensing frequency of one actuation every fifteen minutes, the multiplier for this standard can be 1 (i.e., the spray frequency designated as "light" ) and for each hour of operation of dispensing means 30 at which the frequency is "light", the dispensing time count is multiplied by one, which is added to the "dispensing score" ; if a second mode of operation permits dispensing at a frequency of one actuation every ten minutes, the multiplier for this mode (designated, e.g., as "medium" ) is 1.5, and the dispensing time count is multiplied by 1.5 for each hour dispensing means 30 is operating in the "medium" mode, and the result added to the dispensing score; if a third mode of operation permits dispensing at a frequency of one actuation every five minutes, the multiplier for this mode (designated, e.g., as "heavy" ) is 3, and the dispensing time count is multiplied by 3 for each hour dispensing means 30 is operating in the "heavy" mode, and the result added to the dispensing score.

Each of the multiplied dispensing time counts is added to provide the dispensing score. The dispensing score is then compared to a total score 68, which represents the score when the predetermined amount of olfactory stimulating material has been dispensed, and when the dispensing score is greater than or equal to the total score, a signal is generated 70, indicative of the dispensing of a predetermined amount of the olfactory stimulating material. The total score can be determined in several ways, each readily ascertainable by the skilled artisan. One method of determining the total score is to determine the number of hours it takes to dispense a predetermined amount of the olfactory stimulating material at the frequency or intensity which is used as the standard, that is, the frequency or intensity which is multiplied by 1. This total score can then be used, against which the dispensing score is compared.

The generation of a signal indicative of the fact that the predetermined amount of the olfactory stimulating material has been dispensed can be made in any of several ways. For instance, a circuit (not shown) can be used to illuminate one or more light emitting diodes 72, or other light sources upon direction from the processor. Alternatively, or in addition, a speaker 74 or other like means can be used to provide an audible signal, such as a "beep" or a voice providing an indication of the dispensing of a predetermined amount of the olfactory stimulating material, upon direction from processor 52 through an appropriate circuit (not shown). The circuits which can be employed for illuminating a diode or providing directions to produce an audible signal will be familiar tot he skilled artisan.

Although, as noted, system 50 can be operated by the use of a single software code present in processor 52, it will be understood that the individual functions of system 50 can be separately effected, either electronically, mechanically, or by the provision of separate processors having individual responsibility, as would be familiar to the skilled artisan upon review of this description.

It should be understood by those skilled in the art that obvious modifications can be made to the present invention without departing from the spirit of the invention. Accordingly, reference should be made primarily to the accompanying claims, rather than the foregoing specification, to determine the scope of the invention.

What is claimed is:

1. A dispenser for a material, the dispenser having a system for indicating the dispensing of a predetermined amount of the material, comprising:
   a. a source of material to be dispensed;
   b. a housing having an internal cavity sized to permit insertion therein of the source of material to be dispensed;
   c. dispensing means disposed within the housing for dispensing into the environment the material from the source of material to be dispensed when the dispensing means is operational; and
   d. a system for indicating the dispensing of a predetermined amount of the material to be dispensed, which comprises
      i. a timer for determining the amount of time the dispensing means is operational;
      ii. a calculator for multiplying the time that the dispensing means is operational by a factor representative of the frequency or intensity of operation to produce a dispensing score representative thereof; and
      iii. signal generating means for producing a signal indicating the dispensing of the predetermined amount of the material to be dispensed when the dispensing score is at least equal to a total score required for dispensing a predetermined amount of material from the source of material to be dispensed.

2. The dispenser of claim 1 wherein the material to be dispensed comprises an olfactory stimulating material.

3. The dispenser of claim 2 which further comprises a control means for the dispensing means, which comprises a means for causing the dispensing means to be operational during a specified period.

4. The dispenser of claim 3 wherein the source of material to be dispensed comprises a container having therein a liquid comprising an olfactory stimulating material, and further wherein the dispensing means comprises means for actuating spray of a discrete amount of the liquid from the container.

5. The dispenser of claim 4 wherein the dispensing means comprises an actuator means for depressing a depressible spray head capable of actuating spray of a discrete amount of the liquid from the container.

6. The dispenser of claim 5 wherein the container comprises a spray pump container having a depressible head.

7. The dispenser of claim 5 wherein the container comprises a aerosol container having a depressible head.

8. The dispenser of claim 4 wherein the control means further comprises means for controlling the frequency of actuations during the period during which the dispenser is operational.

9. The dispenser of claim 8 wherein the calculator calculates the dispensing score based on the time during which the dispensing means is operational multiplied by a factor representative of the frequency of actuations during the period during which the dispenser is operational.

10. The dispenser of claim 3 wherein the source of material to be dispensed comprises a cartridge having a cartridge housing and a reservoir disposed inside the housing, the reservoir containing a gel comprising an olfactory stimulating material, and further wherein the dispensing means comprises means for creating a flow of air within the housing such that the air flows at least partially across the surface of the gel.

11. The dispenser of claim 10 wherein the calculator calculates the dispensing score based on the time during which the dispensing means is operational multiplied by a factor representative of the intensity of the air flow.

12. The dispenser of claim 10 wherein the means for creating a flow of air comprises a fan.

13. The dispenser of claim 1 wherein the signal comprises an audible signal.

14. A dispenser for a liquid, the dispenser having a system for indicating the dispensing of a predetermined amount of the liquid, comprising a dispensing means which comprises means for actuating a spray head to cause spray of a liquid; a control means causing the dispensing means to be operational during specified times and at specified frequencies of actuation; a calculator for multiplying the time that the dispensing means is operational by a factor representative of the frequency or intensity of operation to produce a dispensing score representative thereof; and signal generating means for producing a signal indicating the dispensing of the predetermined amount of the liquid to be dispensed when the dispensing score is at least equal to a predetermined total score required for dispensing a predetermined amount of liquid from a source of liquid to be dispensed.

15. The dispenser of claim 14 which further comprises a source of liquid to be dispensed, the source of liquid to be dispensed comprising a spray head container which, when actuated, causes a spray of the liquid to be dispensed.

16. The dispenser of claim 15 wherein the liquid to be dispensed comprises an olfactory stimulating material.

17. The dispenser of claim 14 wherein the signal comprises an audible signal.

18. A method for indicating the dispensing of a predetermined amount of a material in a dispenser having a dispensing means which dispenses the material during periods of operation and frequency or intensity which can be varied, the method comprising:

a. determining the amount of time the dispensing means is operational;

b. multiplying the time that the dispensing means is operational by a factor representative of the frequency or intensity of operation to produce a dispensing score representative thereof; and c. producing a signal indicating the dispensing of the predetermined amount of the material to be dispensed when the dispensing score is at least equal to a predetermined total score required for dispensing a predetermined amount of material.

19. The method of claim 18 wherein the dispensing score is calculated by multiplying the time during which the dispensing means is operational by a factor representative of the frequency of actuations during the period during which the dispenser is operational.

20. The method of claim 18 which further comprises comparing the dispensing score to the total score to determine when the dispensing score is at least equal to the total score.

* * * * *